(12) United States Patent
Livingston et al.

(10) Patent No.: US 10,465,653 B2
(45) Date of Patent: Nov. 5, 2019

(54) WIND TURBINE BLADE WITH HYBRID SPAR CAP AND ASSOCIATED METHOD FOR MAKING

(71) Applicant: General Electric Company, Schenectady, NY (US)

(72) Inventors: Jamie T. Livingston, Simpsonville, SC (US); Donald Joseph Kasperski, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 185 days.

(21) Appl. No.: 15/628,933

(22) Filed: Jun. 21, 2017

(65) Prior Publication Data
US 2018/0372066 A1    Dec. 27, 2018

(51) Int. Cl.
*F03D 1/06* (2006.01)
*B29C 70/52* (2006.01)
(Continued)

(52) U.S. Cl.
CPC ............ *F03D 1/0675* (2013.01); *B29C 70/20* (2013.01); *B29C 70/34* (2013.01); *B29C 70/52* (2013.01); *B29D 99/0025* (2013.01); *B29D 99/0028* (2013.01); *B32B 5/26* (2013.01); *B32B 37/182* (2013.01); *F03D 13/10* (2016.05); *B29K 2307/04* (2013.01); *B29K 2309/08* (2013.01); *B29L 2031/085* (2013.01); *B32B 2260/023* (2013.01); *B32B 2260/046* (2013.01); *B32B 2262/101* (2013.01); *B32B 2262/106* (2013.01); *B32B 2305/10* (2013.01); *B32B 2313/04* (2013.01); *B32B 2315/085* (2013.01); *B32B 2603/00* (2013.01); *F05B 2240/302* (2013.01)

(58) Field of Classification Search
None
See application file for complete search history.

(56) References Cited

U.S. PATENT DOCUMENTS 8,382,440 B2   2/2013   Baker et al.
9,470,205 B2   10/2016  Liu et al.
(Continued)

FOREIGN PATENT DOCUMENTS

EP   3 029 314 A1   6/2016
EP   3 112 673 A1   1/2017

OTHER PUBLICATIONS

Extended European Search Report issued in connection with corresponding EP Application No. 18176764.1 dated Nov. 12, 2018.

*Primary Examiner* — Michael Lebentritt
(74) *Attorney, Agent, or Firm* — Dority & Manning, P.A.

(57) ABSTRACT

A wind turbine blade component is made by providing a plurality of first pultrusion plates formed of a first pultrusion fiber material, and a plurality of second pultrusion plates formed of a second pultrusion fiber material. The first and second pultrusion plates have a length corresponding to an entire length of a spar cap for a wind turbine blade shell. The first and second pultrusion plates are stacked in a hybrid pattern that contains both first and second pultrusion plates, and the stack is arranged on blade shell material in a mold for the blade shell. The stacked hybrid pattern of first and second pultrusion plates is bonded with the blade shell materials to form an integral blade shell and bonded spar cap component.

13 Claims, 5 Drawing Sheets

(51) Int. Cl.
  *B29D 99/00* (2010.01)
  *F03D 13/10* (2016.01)
  *B29C 70/20* (2006.01)
  *B29C 70/34* (2006.01)
  *B32B 5/26* (2006.01)
  *B32B 37/18* (2006.01)
  *B29K 307/04* (2006.01)
  *B29K 309/08* (2006.01)
  *B29L 31/08* (2006.01)

(56) References Cited

U.S. PATENT DOCUMENTS

| | | |
|---|---|---|
| 2011/0135485 A1 | 6/2011 | Wang |
| 2014/0271198 A1 | 9/2014 | Liu et al. |
| 2016/0047252 A1* | 2/2016 | Merzhaeuser .......... B29C 70/00 416/229 A |
| 2016/0146184 A1* | 5/2016 | Caruso .................. F03D 1/0675 416/230 |
| 2016/0146185 A1 | 5/2016 | Yarbrough et al. |
| 2016/0169195 A1 | 6/2016 | Johnson et al. |
| 2017/0080648 A1 | 3/2017 | Tobin et al. |
| 2017/0082087 A1* | 3/2017 | Yarbrough ............ F03D 1/0675 |
| 2017/0082089 A1* | 3/2017 | Yarbrough ............ F03D 1/0675 |
| 2017/0114773 A1* | 4/2017 | Riahi .................... F03D 1/0675 |

* cited by examiner

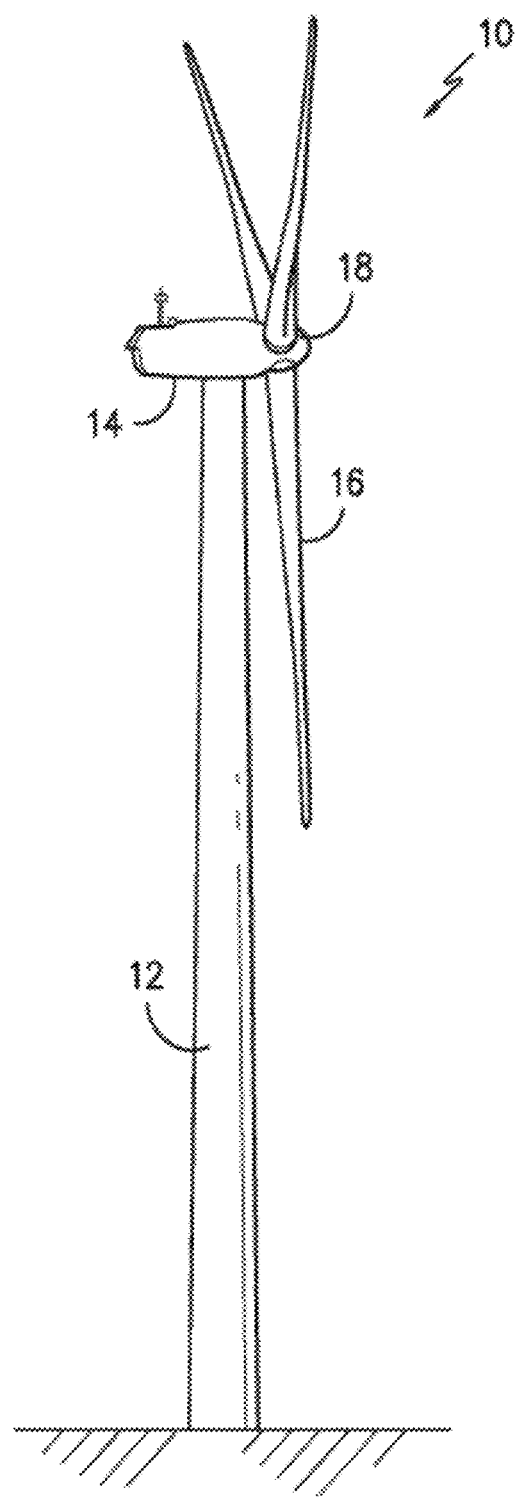
FIG. -1-
*Prior art*

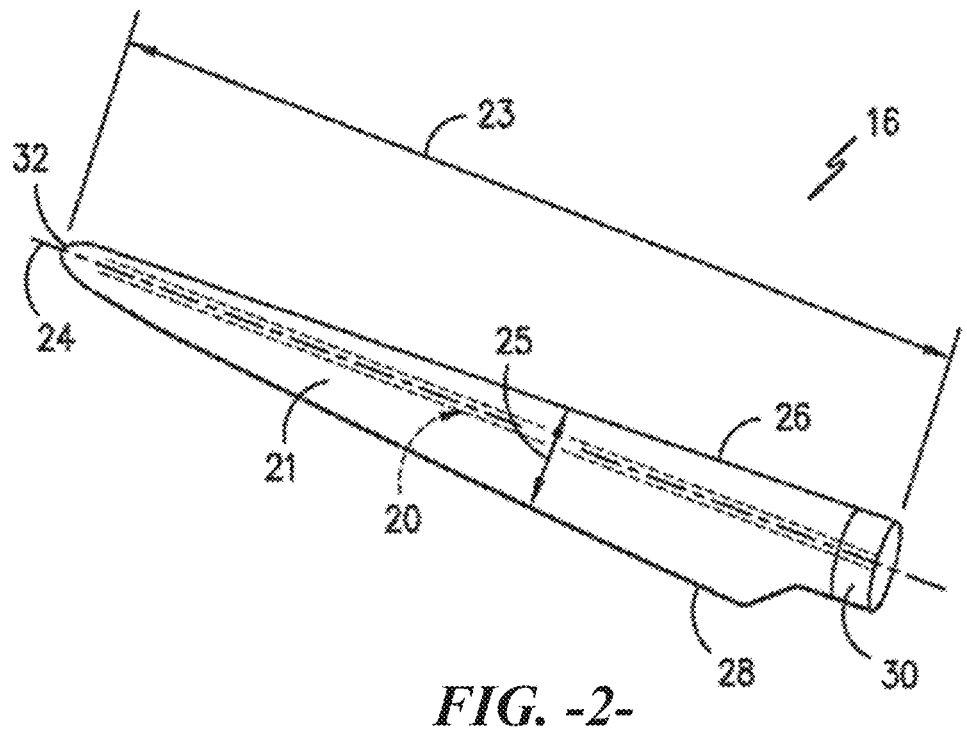
FIG. -2-
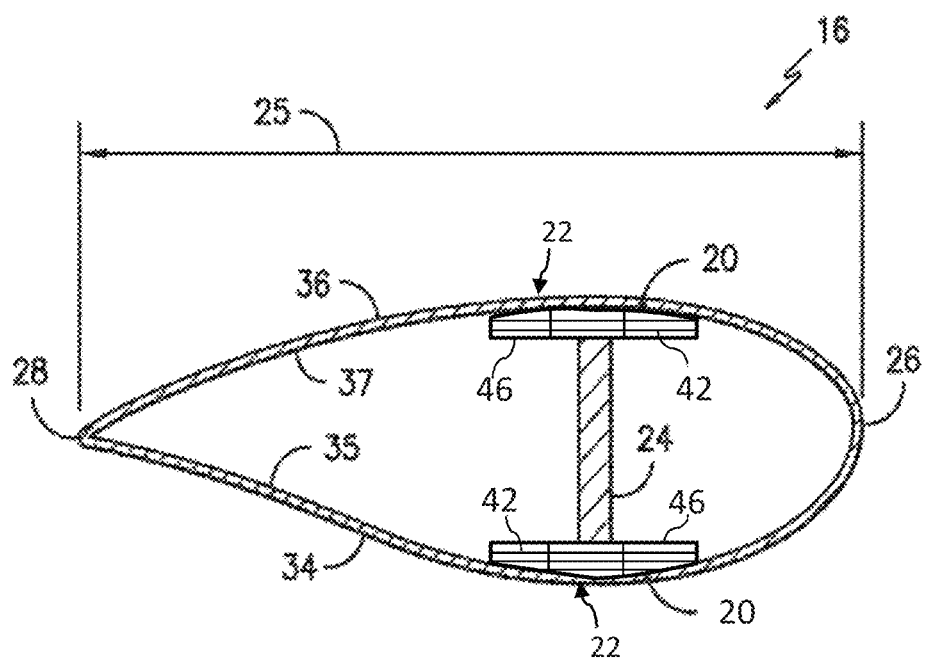
FIG. -3-

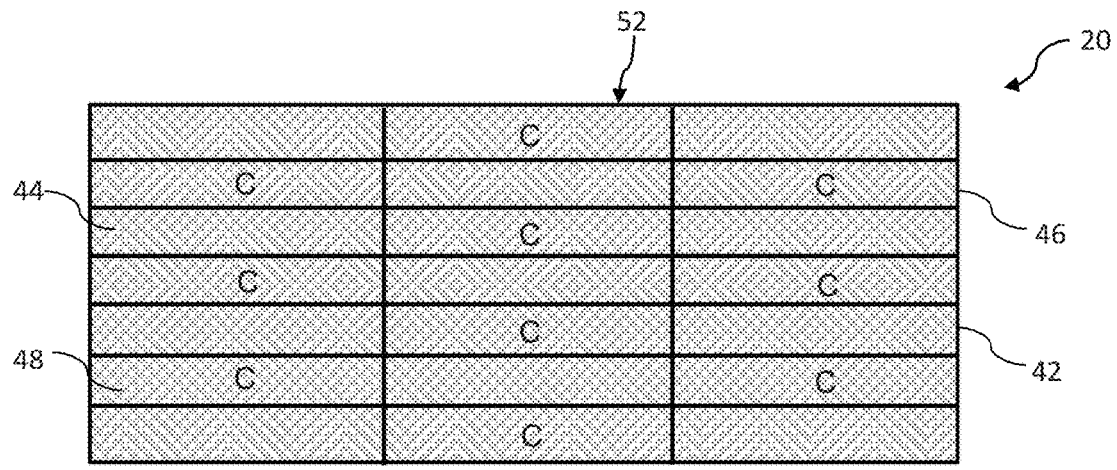
FIG. -4-
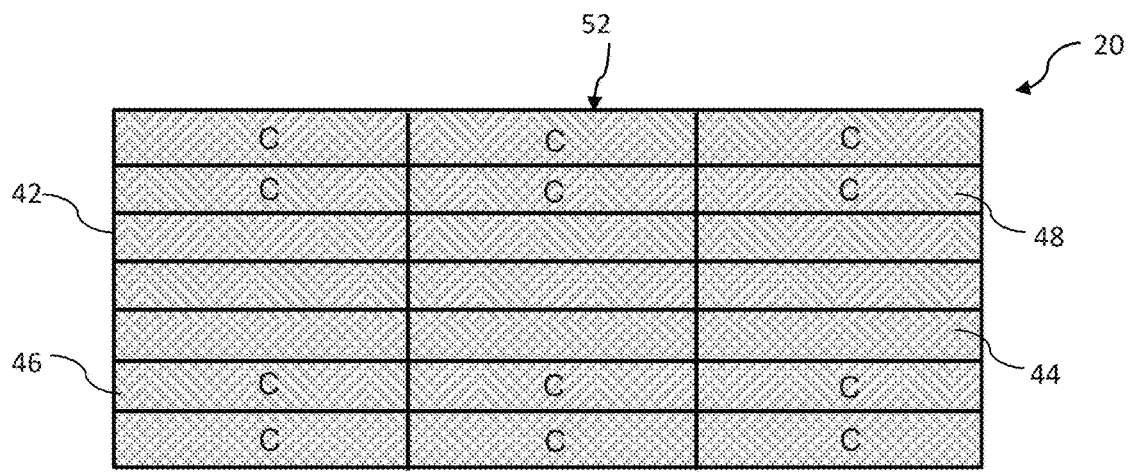
FIG. -5-

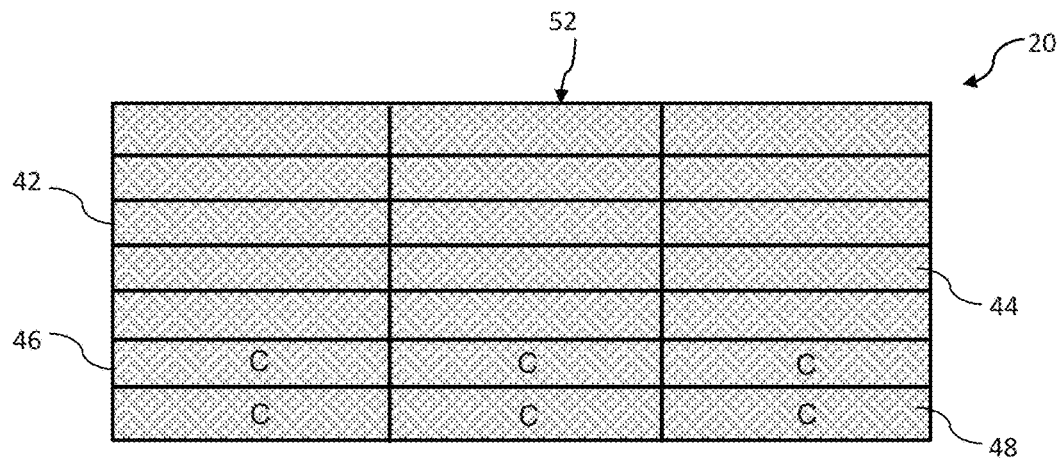
*FIG. -6-*
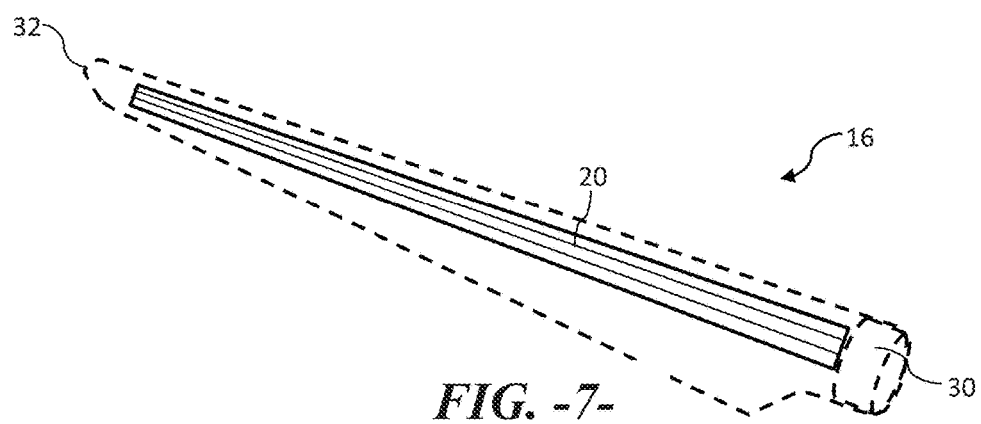
*FIG. -7-*
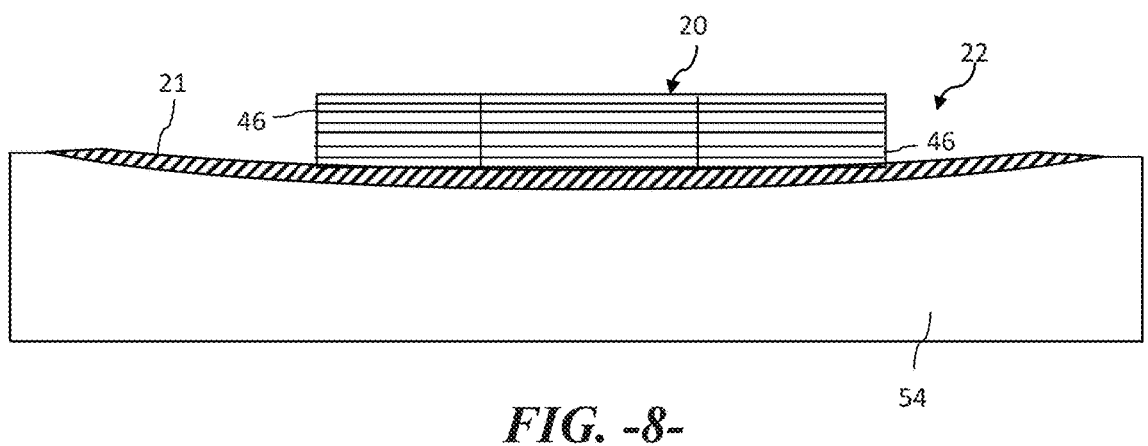
*FIG. -8-*

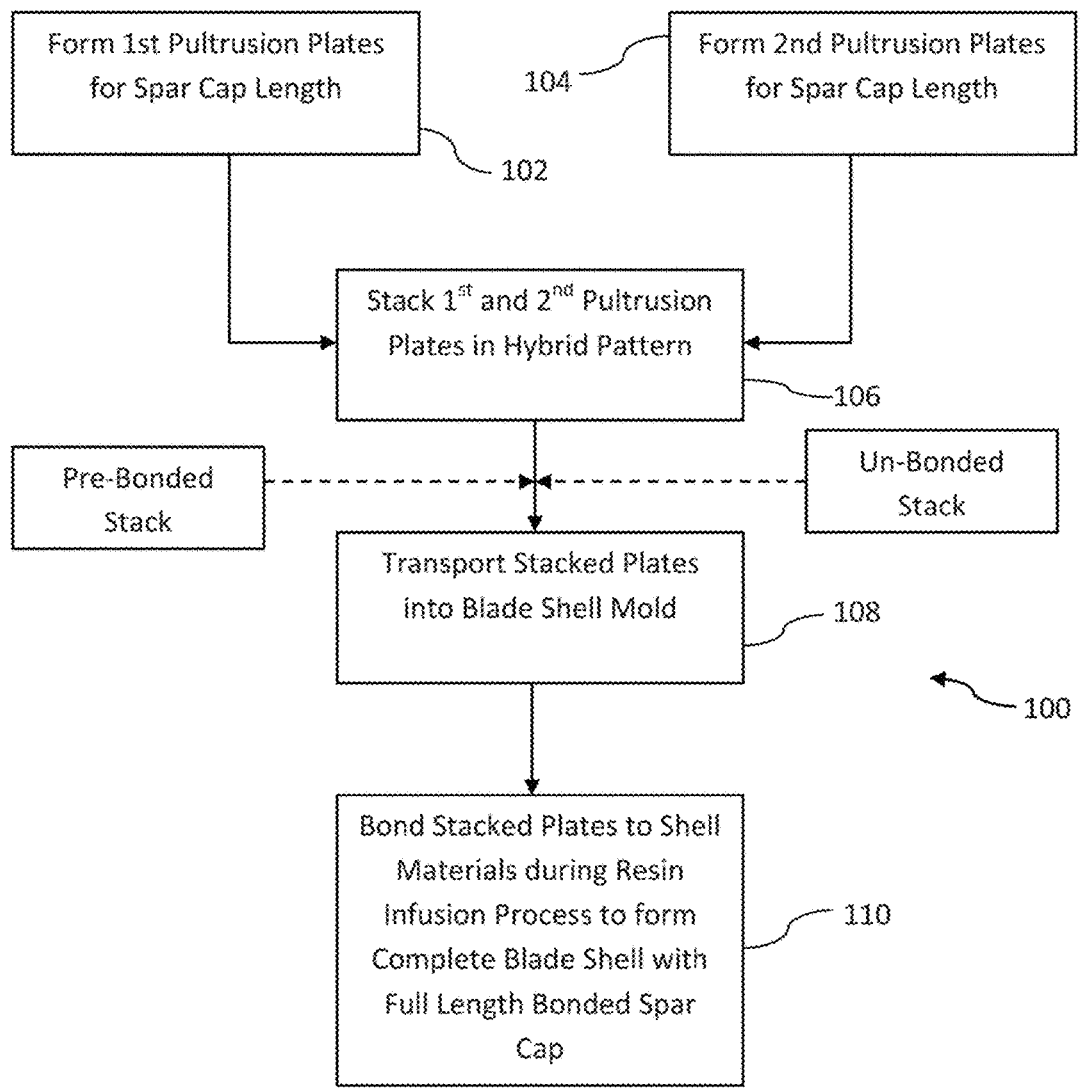
FIG. -9-

WIND TURBINE BLADE WITH HYBRID SPAR CAP AND ASSOCIATED METHOD FOR MAKING

FIELD OF THE INVENTION

The present disclosure relates generally to wind turbines, and more particularly to wind turbine blades having a spar cap manufactured from pultruded plates.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Wind turbine rotor blades generally include a body shell formed by two shell halves of a composite laminate material. The shell halves are generally manufactured using molding processes and then coupled together along the corresponding ends of the rotor blade. In general, the body shell is relatively lightweight and has structural properties (e.g., stiffness, buckling resistance and strength) which are not configured to withstand the bending moments and other loads exerted on the rotor bade during operation. To increase the stiffness, buckling resistance and strength of the rotor blade, the body shell is typically reinforced using one or more structural components (e.g. opposing spar caps with a shear web configured therebetween) that engage the inner surfaces of the shell halves.

The spar caps may be constructed of various materials, including glass fiber laminate composites and carbon fiber laminate composites. More specifically, modern spar caps are often constructed of pultruded composites that are less expensive than traditional composites, as the pultruded composites can be produced in thicker sections. The terms "pultruded composites," "pultrusions," or similar terms are generally used to define reinforced materials (e.g. fibers or woven or braided strands) that are impregnated with a resin and pulled through a heated stationary die such that the resin cures or undergoes polymerization. As such, the pultrusion process is typically characterized by a continuous process that produces composite parts having a constant cross-section. Thus, a plurality of pultrusions can be vacuum infused together in a mold to form the spar caps.

The industry is seeking ways to incorporate pultrusions into the spar caps of wind turbine blades for the material and economic benefits of such materials. For example, U.S. Patent Application Publication 2014/0271198 is directed to segmented wind turbine blades, wherein each blade segment includes a respective spar. The spars are connected together at spar joints, such as finger-type joints. The spar elements include planks manufactured as pultrusions, wherein first planks and second planks have different material compositions.

Accordingly, there is an ongoing need for an improved pultruded spar cap and method for incorporating such spar cap in a wind turbine blade, wherein such need may include optimizing the amount of more expensive and less expensive materials used in the spar cap to achieve a more cost efficient structure.

BRIEF DESCRIPTION OF THE INVENTION

Aspects and advantages of the invention will be set forth in part in the following description, or may be obvious from the description, or may be learned through practice of the invention.

In one aspect, the present invention is directed to a system and method for manufacturing a wind turbine blade shell component that includes providing a plurality of first pultrusion plates formed of a first pultrusion fiber material, and providing a plurality of second pultrusion plates formed of a second pultrusion fiber material. The first and second pultrusion plates have a length corresponding to an entire length of a spar cap for a wind turbine blade shell. The first and second pultrusion plates are stacked in a hybrid pattern that contains both of the different pultrusion plates. The stacked hybrid pattern of first and second pultrusion plates is arranged on blade shell material in a mold for the blade shell. Then, the stacked hybrid pattern of first and second pultrusion plates are bonded with the blade shell materials to form the blade shell component.

In one embodiment, the stacked hybrid pattern of first and second pultrusion plates are bonded with the blade shell materials in a resin infusion process. In this process, the stacked hybrid pattern of first and second pultrusion plates may be un-bonded when arranged on the blade shell materials in the mold, wherein the bonding step includes co-bonding the stacked hybrid pattern of first and second pultrusion plates and blade shell materials by the resin infusion process. Alternatively, the stacked hybrid pattern of pultrusion plates may be pre-bonded together prior to placement in the blade mold.

In a particular embodiment, the first pultrusion fiber material may be a glass fiber material, and the second pultrusion fiber material may be a carbon fiber material.

The stacked hybrid pattern may take on various configurations depending on the strength characteristics desired to be imparted to the spar cap. For example, the first and second pultrusion plates may be arranged in a uniform checker-board hybrid pattern to provide a generally homogenous combination of strength characteristics. In an alternate embodiment, the second pultrusion plates may be placed at a greater concentration along one or both of an outer side of the stack adjacent the blade shell materials and an inner side of the stack opposite from the blade shell materials.

The present invention also encompasses a wind turbine blade shell component that comprises a blade shell, and a spar cap bonded to an interior surface of the blade shell. The spar cap is formed from first pultrusion plates and second pultrusion plates arranged in a stacked hybrid pattern, wherein the first and second pultrusion plates have a continuous unbroken length along an entire length of the spar cap.

In a particular embodiment, the stacked hybrid pattern of first and second pultrusion plates are pre-bonded together prior to being bonded to the blade shell. Alternatively, the stacked hybrid pattern of first and second pultrusion plates are co-bonded with the blade shell materials.

The first and second pultrusion plates are made of different respective fiber materials. For example, the first pultrusion fiber material may be a glass fiber material, and the second pultrusion fiber material may be a carbon fiber material.

The present invention also encompasses a wind turbine blade having a pressure side shell and a suction side shell, wherein the suction and pressure side shells are joined along a leading and trailing edge of the blade. One or both of the suction and pressure side shell components further include a spar cap bonded to an interior surface of the shell, wherein the spar cap includes first pultrusion plates and second pultrusion plates arranged in a stacked hybrid pattern. The first and second pultrusion plates have a continuous unbroken length along an entire length of the spar cap.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of a conventional wind turbine;

FIG. 2 is a perspective view of a conventional wind turbine blade;

FIG. 3 is a side cross-sectional view of a wind turbine blade incorporating spar caps in accordance with the invention;

FIG. 4 is an end diagram view of an embodiment of a spar cap in accordance with the present invention;

FIG. 5 is an end diagram view of another embodiment of a spar cap in accordance with the present invention;

FIG. 6 is an end diagram view of a further embodiment of a spar cap in accordance with the present invention;

FIG. 7 is perspective view of a wind turbine blade with a continuous spar cap configuration in accordance with aspects of the invention;

FIG. 8 is a partial cross-sectional view of shell member and spar cap; and

FIG. 9 is a diagram of a method embodiment in accordance with the invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of a horizontal axis wind turbine 10. It should be appreciated that the wind turbine 10 may also be a vertical-axis wind turbine. As shown in the illustrated embodiment, the wind turbine 10 includes a tower 12, a nacelle 14 mounted on the tower 12, and a rotor hub 18 that is coupled to the nacelle 14. The tower 12 may be fabricated from tubular steel or other suitable material. The rotor hub 18 includes one or more rotor blades 16 coupled to and extending radially outward from the hub 18. The rotor blades 16 rotate the rotor hub 18 to enable kinetic energy to be transferred from the wind into usable mechanical energy, and subsequently, electrical energy. Specifically, the hub 18 may be rotatably coupled to an electric generator (not illustrated) positioned within the nacelle 14 for production of electrical energy.

Referring to FIGS. 2 and 3, one of the rotor blades 16 of FIG. 1 is illustrated in accordance with aspects of the present subject matter. In particular, FIG. 2 illustrates a perspective view of the rotor blade 16, whereas FIG. 3 illustrates a cross-sectional view of the rotor blade 16. As shown, the rotor blade 16 generally includes a blade root 30 configured to be mounted or otherwise secured to the hub 18 (FIG. 1) of the wind turbine 10 and a blade tip 32 disposed opposite the blade root 30. A body shell 21 of the rotor blade 16 generally extends between the blade root 30 and the blade tip 32 along a longitudinal axis 27. The body shell 21 may generally serve as the outer casing/covering of the rotor blade 16 and may define a substantially aerodynamic profile, such as by defining a symmetrical or cambered airfoil-shaped cross-section. The body shell 21 may also define a pressure side 34 and a suction side 36 extending between leading and trailing ends 26, 28 of the rotor blade 16. Further, the rotor blade 16 may also have a span 23 defining the total length between the blade root 30 and the blade tip 32 and a chord 25 defining the total length between the leading edge 26 and the trialing edge 28. As is generally understood, the chord 25 may generally vary in length with respect to the span 23 as the rotor blade 16 extends from the blade root 30 to the blade tip 32.

In several embodiments, the body shell 21 of the rotor blade 16 may be formed as a single, unitary component. Alternatively, the body shell 21 may be formed from a plurality of shell components 22. For example, the body shell 21 may be manufactured from a first shell half 22 generally defining the pressure side 34 of the rotor blade 16 and a second shell half 22 generally defining the suction side 36 of the rotor blade 16, with such shell halves being secured to one another at the leading and trailing ends 26, 28 of the blade 16. Additionally, the body shell 21 may generally be formed from any suitable combination of materials. For instance, in one embodiment, the body shell 21 may be formed entirely from a laminate composite material, such as a carbon fiber reinforced laminate composite or a glass fiber reinforced laminate composite. Alternatively, one or more portions of the body shell 21 may be configured as a layered construction and may include a core material, formed from a lightweight material such as wood (e.g., balsa), foam (e.g., extruded polystyrene foam) or a combination of such materials, disposed between layers of laminate composite material.

Referring particularly to FIG. 3, the rotor blade 16 may also include one or more longitudinally extending structural components configured to provide increased stiffness, buckling resistance and/or strength to the rotor blade 16. For example, the rotor blade 16 may include a pair of longitudinally extending spar caps 20 configured to be engaged against the opposing inner surfaces 35, 37 of the pressure and suction sides 34, 36 of the rotor blade 16, respectively. Additionally, one or more shear webs 24 may be disposed between the spar caps 20 to form a beam-like configuration. Multiple I-beam structures may be used with respective spar caps 20 in accordance with aspects of the invention. The spar caps 20 may generally be designed to control the bending stresses and/or other loads acting on the rotor blade 16 in a generally spanwise direction (a direction parallel to the span 23 of the rotor blade 16) during operation of a wind turbine 10. Similarly, the spar caps 20 may also be designed to withstand the spanwise compression occurring during operation of the wind turbine 10. Each of the spar caps 20 is depicted in FIG. 3 as formed from a stack of first and second pultrusion plates 42, 46, as discussed in greater detail below.

As discussed above, it is generally known in the art to form fiber material pultrusions into plates and to use such plates to form spar caps in wind turbine blades. For example, U.S. Patent Application Publication 2017/0028587 (incorporated herein by reference for all purposes) describes an inline processing method and system for manufacturing pultruded plates that may be used in the method and system of the present invention.

Referring now to FIG. 4, a partial, cross-sectional or end view of one embodiment of a spar cap 20 according to the present invention is illustrated. The spar cap 20 includes a plurality of individual pultrusion plates 42, 46 in a stacked configuration 52, which may include a plurality of rows and columns of the plates 42, 46. Each plate 42, 46 is formed by a plurality of pultrusions bonded together in a generally plate-like shape having a width dimension and thickness dimension defined by opposite parallel sides, respectively. The plurality of plates within the stack 52 include one or more first pultrusion plates 42 formed from a first fiber material 44, such as glass fiber material pultrusions, and one or more second pultrusion plates 46 formed from a second fiber material 48, such as carbon (represented by the "C" in FIG. 4) fiber material pultrusions. As is readily understood, the carbon pultrusion plates 48 have different (increased) strength characteristics as compared to the glass pultrusion plates 42, but can be significantly more expensive. The spar cap 20 can be designed with a stacked array 52 using both types of plates 42, 46 to achieve an overall desired strength and stiffness profile for the spar cap 20 while maximizing use of the glass pultrusion plates 42 to decrease costs.

It should be appreciated that the present method and wind turbine blades 16 are not limited by the particular type of pultrusion fiber materials used to form the plates 42, 46, so long as two different types of materials are used to achieve an overall desired strength and stiffness profile for the spar cap 20. In the embodiments described herein for illustrative purposes, the first pultrusion fiber material 44 may be a glass fiber material, and the second pultrusion fiber material 48 may be a carbon fiber material.

In a particular embodiment, the first and second pultrusion plates 42, 46 have a continuous and unbroken length dimension corresponding to an entire length of the spar cap 20 for a wind turbine blade shell 21 (pressure and/or suction side shells), as depicted in FIG. 7. In other words, the spar cap 20 is not formed by distinct span-wise sections of the plates 42, 46 joined together at one or more locations along the span 23 (FIG. 2) of the blade 16, but has a bonded construction of continuous (span-wise) plates 42, 46.

In one embodiment of the manufacturing method, the first and second pultrusion plates 42, 46 are arranged in a stacked hybrid pattern 52 that contains both of the different pultrusion plates 42, 46 without bonding the plates together within the stack. The stacked hybrid pattern 52 can include any combination of rows and columns of the plates 42, 46. The stacked hybrid pattern 52 is then arranged on the interior side 35, 37 (FIG. 3) of the blade shell 21 materials in a mold 54 for the blade shell (FIG. 8). Then, the stacked hybrid pattern 52 of first and second pultrusion plates 42, 46 are bonded with the blade shell 21 materials in a resin infusion process to form an integral blade shell component 22, as represented in FIG. 8. The resin infusion process thus co-bonds the stacked hybrid pattern 52 of first and second pultrusion plates 42, 46 and blade shell materials 21.

In an alternate embodiment, the stacked hybrid pattern 52 of plates 42, 46 may be pre-bonded together to essentially define a bonded spar cap 20 prior to being placed in the blade shell mold 54. The subsequent resin infusion process then bonds the pre-bonded spar cap 20 to the interior side 35, 37 of the blade shell 21.

The stacked hybrid pattern 52 of plates 42, 46 may take on various configurations depending on the strength, stiffness, or local stability characteristics desired to be imparted to the spar cap 20. The stack is not limited by the number or rows or columns of the plates 42, 46. At the root 30 or blade tip 32, the spar cap 20 may taper in width and/or height dimension by decreasing the number of plates 42, 46 in these regions during the forming process. In the embodiment depicted in FIG. 4, the first 42 and second 46 pultrusion plates may be arranged in a uniform checker-board hybrid pattern to provide a generally homogenous combination of strength characteristics to the spar cap 20.

In an alternate embodiment depicted in FIG. 5, the second pultrusion plates 46 may be placed at a greater concentration along one or both of an outer side of the stacked hybrid pattern 52 adjacent the blade shell 21 materials 21 and/or an inner side of the stacked hybrid pattern 52 opposite from the blade shell 21 materials. For example, one or more rows of plates at either (FIG. 6) or both (FIG. 5) of the outer sides of the stack 52 may be formed completely by the second pultrusion plates 46.

As mentioned above, the present invention also encompasses a wind turbine blade shell component 22 (pressure side 34 or suction side 36) that comprises a blade shell 21, and a spar cap 20 bonded to an interior surface 35, 37 of the blade shell in accordance with the aspects discussed above.

The present invention also encompasses a wind turbine blade 16 having a pressure side shell 34 and a suction side shell 36, wherein the suction and pressure side shells are joined along a leading 26 and trailing edge 28 of the blade. One or both of the suction and pressure side shell components further include a spar cap 20 bonded to an interior surface 35, 37 of the shell, wherein the spar cap 20 includes first pultrusion plates 42 and second pultrusion plates 46 arranged in a stacked hybrid pattern 52, as discussed above.

FIG. 9 generally depicts a generic manufacturing method 100 in accordance with aspects of the invention. At step 102, the first pultrusion plates 42 are formed. Likewise, at step 104, the second pultrusion plates 46 are formed. These steps may be carried out in concurrent inline processes.

At step 106, the first and second pultrusion plates 42, 46 are arranged in the desired stacked hybrid pattern 52. The stack 52 may remain unbounded (as discussed above), or may be bonded together. The pultrusion plates 42, 46 may be cut and prepared in the same step, or previously cut and prepared.

At step 108, the stacked hybrid pattern 52 is transported into the blade shell mold 54. It should be understood that steps 106 and 108 may be combined into a single step. In other words, the stack 52 may be formed directly in the blade mold 54.

At step 110, the stack 52 and blade shell materials are infused with resin to form a complete blade shell component 22 with full-length spar cap 20 bonded to an interior surface 35, 37 thereof. If the spar cap 20 was not pre-bonded, this step co-bonds the spar cap plates and blade shell materials in a single process step.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for manufacturing a wind turbine blade shell component, comprising:
   providing a plurality of first pultrusion plates formed of a first pultrusion fiber material;
   providing a plurality of second pultrusion plates formed of a second pultrusion fiber material;
   wherein the first pultrusion plates do not include the second pultrusion fiber material and the second pultrusion plates do not include the first pultrusion fiber material;
   the first and second pultrusion plates having a length corresponding to an entire length of a spar cap for a wind turbine blade shell;
   stacking the first and second pultrusion plates in a hybrid pattern that contains both of the first and second pultrusion plates;
   arranging the stacked pattern of first and second pultrusion plates on blade shell material in a mold for the blade shell; and
   bonding the stacked pattern of first and second pultrusion plates with the blade shell materials to form the blade shell component.

2. The method of claim 1, wherein the stacked pattern of first and second pultrusion plates are bonded with the blade shell materials in a resin infusion process.

3. The method of claim 2, wherein the stacked pattern of first and second pultrusion plates are un-bonded when arranged on the blade shell materials in the mold, the bonding step comprising co-bonding the stacked pattern of first and second pultrusion plates and blade shell materials by the resin infusion process.

4. The method of claim 1, wherein the first pultrusion fiber material comprises a glass fiber material, and the second pultrusion fiber material comprises a carbon fiber material.

5. The method of claim 4, wherein the first and second pultrusion plates are arranged m a uniform checker-board pattern in the stacked pattern of the first and second pultrusion plates.

6. The method of claim 4, wherein second pultrusion plates have a greater concentration along one or both of an outer side of the stacked pattern of first and second pultrusion plates adjacent the blade shell materials and an inner side of the stacked pattern of first and second pultrusion plates opposite from the blade shell materials.

7. A wind turbine blade shell component, comprising:
   a blade shell;
   a spar cap bonded to an interior surface of the blade shell;
   the spar cap comprising first pultrusion plates formed of a first pultrusion fiber material and second pultrusion plates formed of a pultrusion fiber material arranged in a stacked pattern that contains both of the first and second pultrusion plates;
   wherein the first pultrusion plates do not include the second pultrusion fiber material and the second pultrusion plates do not include the first pultrusion fiber material; and
   the first and second pultrusion plates having a continuous unbroken length along an entire length of the spar cap.

8. The wind turbine blade shell component as in claim 7, wherein the first and second pultrusion plates are pre-bonded together in the stacked pattern of first and second pultrusion plates prior to being bonded to the blade shell.

9. The wind turbine blade shell component as in claim 7, wherein the stacked pattern of first and second pultrusion plates are co-bonded with the blade shell materials.

10. The wind turbine blade shell component as in claim 7, wherein the first pultrusion fiber material comprises a glass fiber material and the second pultrusion fiber material comprises a carbon fiber material.

11. The wind turbine blade shell component as in claim 10, wherein the first and second pultrusion plates are arranged in a uniform checker-board pattern in the stacked pattern of first and second pultrusion plates.

12. The wind turbine blade shell component as in claim 10, wherein second pultrusion plates have a greater concentration along one or both of an outer side of the stacked pattern of first and second pultrusion plates adjacent the blade shell materials and an inner side of the stacked pattern of first and second pultrusion plates opposite from the blade shell materials.

13. A wind turbine blade, comprising:
   a pressure side shell, and a suction side shell, wherein the suction and pressure side shells are joined along a leading and trailing edge of the blade;
   one or both of the suction and pressure side shells components further comprising a spar cap bonded to an interior surface of the shell;
   the spar cap comprising of first pultrusion plates formed of a first pultrusion fiber material and second pultrusion plates formed of a second pultrusion fiber material arranged in a pattern;
   wherein the first pultrusion plates do not include the second pultrusion fiber material and the second pultrusion plates do not include the first pultrusion fiber material; and
   the first and second pultrusion plates having a continuous unbroken length along an entire length of the spar cap.

\* \* \* \* \*